United States Patent [19]
Carter, III

[11] 3,896,415
[45] July 22, 1975

[54] SIGNAL LIGHT CIRCUIT INTEGRATOR

[76] Inventor: Adolphus J. Carter, III, 205 E. 57th St., Savannah, Ga. 31405

[22] Filed: July 6, 1973

[21] Appl. No.: 377,014

[52] U.S. Cl. .................................... 340/67; 340/78
[51] Int. Cl. ............................................. B60q 1/38
[58] Field of Search .............. 340/67, 74, 78, 81 R; 315/77, , 80; 307/10 LS

[56] References Cited
UNITED STATES PATENTS

| | | | |
|---|---|---|---|
| 3,040,207 | 6/1962 | Grontkowski | 340/81 F |
| 3,601,795 | 8/1971 | Shimizu et al. | 340/82 X |
| 3,656,103 | 4/1972 | Tanaka et al. | 340/67 |
| 3,659,267 | 4/1972 | Holt | 340/67 |

FOREIGN PATENTS OR APPLICATIONS

| | | | |
|---|---|---|---|
| 1,110,180 | 4/1968 | United Kingdom | 340/81 R |

Primary Examiner—Donald J. Yusko
Attorney, Agent, or Firm—Cushman, Darby & Cushman

[57] ABSTRACT

A signal light circuit integrator is disclosed for integrating separate turn signal light and brake light signals into a single signal for energizing a single filament lamp. The circuit includes a pair of normally open relays, each connected between an associated signal lamp and a brake light signal input terminal. Each relay switch is controlled by means of an associated transistor. The transistors are each in turn controlled by an R-C time circuit which is charged by a right or left turn light signal which when present turns off the transistor to which it is coupled. With the transistor turned off, the relay is de-energized thereby interrupting the energization of the lamp by the brake light signal. At the same time the turn signal light is coupled to the lamp to intermittently energize it.

5 Claims, 1 Drawing Figure

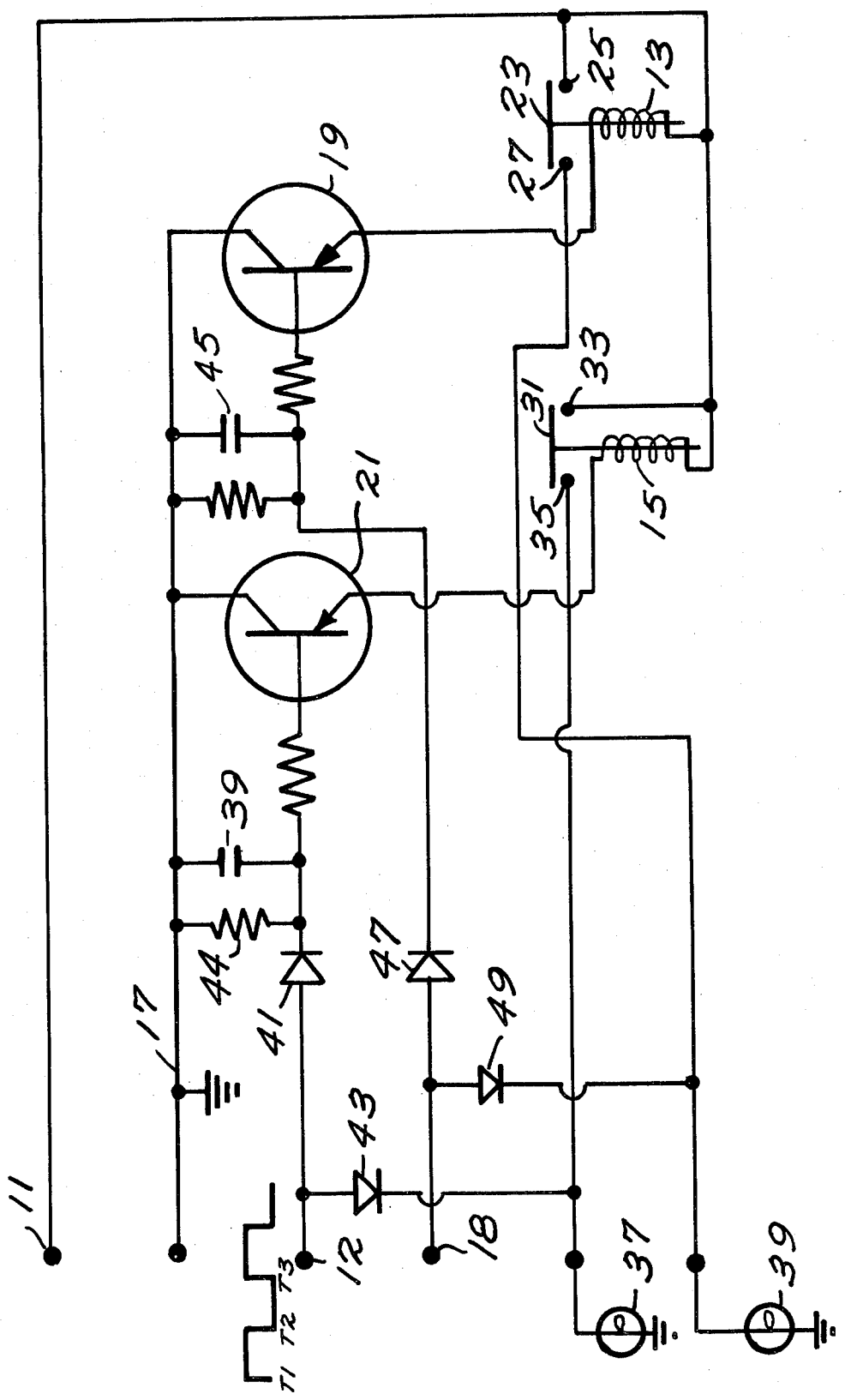

SIGNAL LIGHT CIRCUIT INTEGRATOR

BACKGROUND OF THE INVENTION

This invention relates to a signal light integrator for driving a single filament lamp from separate brake light and turn signal light energizing circuits.

In most foreign made motor vehicles and in a number of U.S. made vehicles, the turn signal light and the brake light are energized from separate energizing circuits. This has created a vexing problem when a trailer which typically has a pair of single filament lamps at the rear thereof is connected to a vehicle having separate brake light and signal light circuits. In such a situation only one signal i.e., the brake light or the turn signal light, can be coupled to the trailer to provide either stop or turning information. However, it is now required that trailers provide both turn signal and stop light information to those traveling behind the trailer. This problem has been solved in the past by adding another circuit and associated signal light to each side of the trailer. The added lights receive the turn signal information from the vehicle to which the trailer is attached while the lamps originally on the trailer provide stop light information. This solution to the problem is both wasteful and costly and in addition requires extra time for securing the extra lights to the trailer at the time the trailer is connected to a vehicle.

It is therefore an object of this invention to provide a means for integrating the signal light and brake light signals of a vehicle to drive a single filament lamp in a trailer attached to the vehicle, using only an add on device which can be connected to an existing system without changing the existing vehicle lighting system while using only the signals present in the vehicle for power.

SHORT STATEMENT OF THE INVENTION

Accordingly, this invention relates to a signal light integrator having means for normally coupling a brake light signal to a pair of single filament lamps positioned at the rear of a trailer. Switching means are provided for interrupting the brake light energizing current to one of the lamps when a corresponding turn light signal derived from a turn light signal circuit is coupled to the integrator.

BRIEF DESCRIPTION OF THE DRAWINGS

Other objects, features and advantages of this invention will become more fully apparent from the following detailed description, the appended claims and the accompanying drawing, which is a schematic diagram of the signal light integrator circuit of this invention.

DETAILED DESCRIPTION OF THE PREFERRED EMBODIMENT

Refer now to FIG. 1 which is a schematic illustration of the circuit of the present invention. Input terminal 11 is connected to the brake light signal circuit of the vehicle to which a trailer is attached. This input circuit is connected directly to a pair of normally open relays 13 and 15. Relay 13 is connected to the chassis ground 17 via PNP transistor 19. Relay 15 is connected to the chassis ground via PNP transistor 21. Thus, when the brake lights of the vehicle are energized, current will flow from terminal 11 through relays 13 and 15 and through transistors 19 and 21, respectively, to ground 17. With relay 13 conducting normally open switch arm 23 is closed on contacts 25 and 27 thereby connecting input terminal 11 with a single filament lamp 29 which is secured to the right side of the rear of the trailer. At the same time, the brake light signal current flows through relay 15 and transistor 21 to ground thereby closing normally open switch arm 31 on contacts 33 and 35. Accordingly, brake signal light current is conducted from terminal 11 through switch arm 31 to a second single filament lamp which is located on the left side of the rear of the trailer.

Input terminal 12 is connected to the left turn signal energizing circuit of the vehicle to which the trailer is connected, and input terminal 18 is connected to the right turn signal energizing circuit of the vehicle. When, for example, the left turn signal lamp on the vehicle is energized with a square wave signal such as illustrated in the FIGURE, capacitor 39 is charged rapidly through diode 41 thereby cutting off transistor 21. With transistor 21 cut off, relay 15 is de-energized and accordingly the brake light signal to lamp 37 is interrupted. However, lamp 37 remains energized because the turn signal is conducted through diode 43 to the single filament lamp 37. At time T2 however, the turn signal goes to a low voltage level and accordingly, diode 43 no longer conducts. Since capacitor 39 is fully charged, transistors 21 remains in a cut-off state. Accordingly, lamp 37 is de-energized. Capacitor 39 then discharges through resistor 44 at such a rate that transistor 21 is not turned on before the next positive going portion of the input turn signal occurs at time T3. It therefore can be seen that the present circuit permits the turn signal to override the brake light signal whenever a turn signal light is to be energized.

If the right turn signal light is to be energized, a turn signal is coupled to input terminal 18 such that current is conducted to a capacitor 45 via diode 47 to thereby turn off transistor 19. With transistor 19 turned off, normally open relay 13 is de-energized to thereby interrupt the brake light signal which is coupled therethrough to single filament lamp 29. With relay 13 de-energized, lamp 29 remains energized by the turn signal voltage which is coupled to the lamp through diode 49. When the input turn signal goes to ground potential, relay 13 remains cut off because capacitor 45 provides the required biasing potential at the base of transistor 19. Accordingly, no current will flow through the filament of lamp 29. It, therefore, can be seen that the turn signal effectively overrides the brake light signal to flash on and off lamp 29.

While the present invention has been described in connection with a preferred embodiment, it should be understood that there may be other equivalent embodiments which fall within the spirit and scope of the present invention as defined by the appended claims.

What is claimed is:

1. A signal light integrator circuit which integrates separate turn signal light and brake light signals generated by a turn signal and brake light system in a vehicle for energizing single filament lamps in a trailer connected to said vehicle wherein said integrator circuit is coupled to said vehicle turn signal and brake light system without modifying said vehicle system and wherein the power for operating said integrator circuit is derived from said vehicle system, the combination comprising, first switch means for conducting a brake light signal from said vehicle to a first indicator light positioned on said trailer, second switch means for conducting said brake light signal from said vehicle to a second indicator light positioned on said trailer, means for opening said first switch means when a first turn signal is coupled to said circuit, means for energizing said first indicator lamp with said first turn signal, means for opening said second switch means when a second turn signal is coupled to said circuit, and means for energizing said second indicator lamp with said second turn signal.

2. The signal light integrator circuit of claim 1 wherein said first and second switch means are relay switches.

3. The signal light integrator circuit of claim 2 wherein said relay switches are normally open.

4. The signal light integrator circuit of claim 2 wherein said means for opening said first and second switch means comprises a pair of three terminal semiconductor switching devices each connected to respective ones of said switch means and each having its control terminal connected to a turn signal light circuit of the vehicle, and means for storing a turn signal light voltage at said control terminal to thereby maintain said three terminal switch in a cut off state when the turn signal light circuit of said vehicle is energized.

5. A signal light integrator circuit which integrates separate turn signal light and brake light signals generated by a turn signal and brake light system in a vehicle for energizing single filament lamps in a trailer connected to said vehicle wherein said integrator circuit is coupled to said vehicle turn signal and brake light system without modifying said vehicle system and wherein the power for operating said integrator circuit is derived from said vehicle system, the combination comprising, a first switch means for conducting a brake light signal from said vehicle to a first single filament indicator light positioned in said trailer, said first switching means being normally open, second switching means for conducting said brake light signal from said vehicle to a second single filament indicator light positioned in said trailer, said second switching means being normally open, each of said switching means being closed upon the application of a brake light signal from said vehicle thereto, means for energizing said first single filament indicator lamp with a first turn signal coupled from said vehicle to said trailer, means for energizing said second single filament indicator lamp with a second turn signal coupled from said vehicle to said trailer, means for opening said first switching means when a first turn signal and a brake light are simultaneously coupled to said circuit, means for opening said second switching means when said second turn signal and said brake light are simultaneously coupled to said circuit, wherein said means for opening said first and second switching means comprises a pair of semiconductor switching devices each connected to respective ones of said switching means and each having its control terminal connected to a turn signal light circuit of said vehicle, and means for storing a turn signal light voltage at said control terminal to thereby maintain said semiconductor switching device in a cut-off state when the turn signal light circuit of said vehicle is energized.

* * * * *